No. 779,843. PATENTED JAN. 10, 1905.
C. FREDRICKS.
FISH HOOK.
APPLICATION FILED APR. 4, 1904.

Witnesses
Edward G. Rowland
Harry S. Woodridge

Charles Fredricks
Inventor
By his Attorney

No. 779,843. Patented January 10, 1905.

UNITED STATES PATENT OFFICE.

CHARLES FREDRICKS, OF NEW YORK, N. Y.

FISH-HOOK.

SPECIFICATION forming part of Letters Patent No. 779,843, dated January 10, 1905.

Application filed April 4, 1904. Serial No. 201,393.

*To all whom it may concern:*

Be it known that I, CHARLES FREDRICKS, a citizen of the United States, and a resident of No. 842 Broadway, borough of Brooklyn, city and State of New York, have invented a new and useful Improvement in Fish-Hooks; and I do hereby declare that the following is a full, clear, and exact description of the same.

My invention relates in general to fish-hooks and in particular to improvements therein designed to prevent the fish from becoming unhooked after he is caught.

To this end my invention consists of certain novel features of construction and combinations of parts hereinafter fully described, and particularly pointed out in the claim.

Reference is to be had to the accompanying drawings, forming part of the specification, in which the same numbers designate corresponding parts in both figures.

Figure 1:
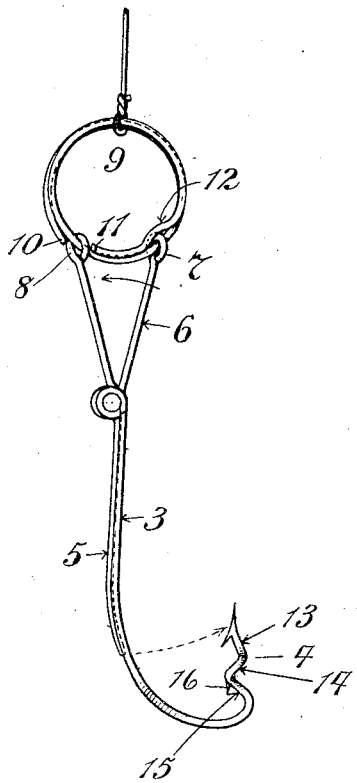
Figure 2:
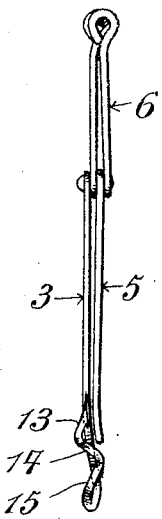

Figure 1 is a side view of a fish-hook embodying my invention. Fig. 2 is another view of the same, taken at right angles to the plane of Fig. 1.

In the drawings, 3 is the shank of the hook, and 4 the barbed arm, which is bent and curved in novel fashion, as hereinafter described. To the shank of the hook is pivoted a snap 5, normally lying at the side of the shank, but designed to meet and close the point of the hook, as indicated in Fig. 1. The snap 5 has an upper arm 6, which has on its upper end an eye 7, corresponding to the eye 8 on the upper end of the shank 3. Through the eye 8 is carried one turn of a double ring 9, the ends 10 11 of which abut against opposite sides of the eye 8 and hold the eye in place thereon. The eye 7 travels on the turn on which is the eye 8 to and from said eye 8, but is normally held away from the eye 8 in a spring-loop 12, formed on the other turn of the ring 9, so that the snap 5 will be normally held in place alongside the shank 3; but when a fish is caught on the hook and tension is thereby put on the line the eye 7 will slip out of the loop 12 toward the eye 8 and be locked therewith between the ends 10 and 11, thus bringing the point of the snap 5 to the point of the hook, and thereby securely locking the fish on the hook. To unhook the fish, the snap is pushed back alongside the shank of the hook and the eye 7 thus reset in the spring-loop 12.

Looking at the point of the hook toward the shank, the lower part of the shank to its junction with the barbed arm 4 is bent to the right away from the plane of the shank, as indicated in Fig. 2. Still facing the point, the arm 4 is bent from the base of the barb downward, forward, and to the left, forming the straight section 13. Then the arm 4 is bent downward, rearward, and to the right, forming the straight section 14. Then the arm 4 is bent downward, forward, and to the left, forming the straight section 15, which then at a bend meets the body of the hook. By these special straight bends of the barbed arm out of the plane of the shank the necessary zigzag to insure the hooking of the fish by his own wriggling and securely hold the fish after he is caught is obtained without unduly lengthening the barbed arm, which should never be longer than the width of the hook in order to avoid upsetting the fish and easily to enter his mouth.

I am aware that hooks have been heretofore designed with the barbed arm bent in the plane of the shank; but by this form the requisite number of proper bends cannot be obtained without excessively lengthening the barbed arm.

I sometimes employ a second barb 16, formed at the junctions of the straight sections 14 and 15 and projecting downward parallel with the shank of the hook to more securely hold the fish when caught.

Having thus fully described my invention and the manner in which I carry the same into practice, I claim as new and desire to secure by Letters Patent—

A fish-hook having its barbed arm bent in zigzag form both forwardly and backwardly and laterally to both sides of the plane of the shank substantially shown and described.

In testimony whereof I have hereunto set my hand the 31st day of March, 1904.

CHARLES FREDRICKS.

In presence of—
CLARENCE L. BURGER,
HARRY S. GOODRIDGE.